Figure 1:
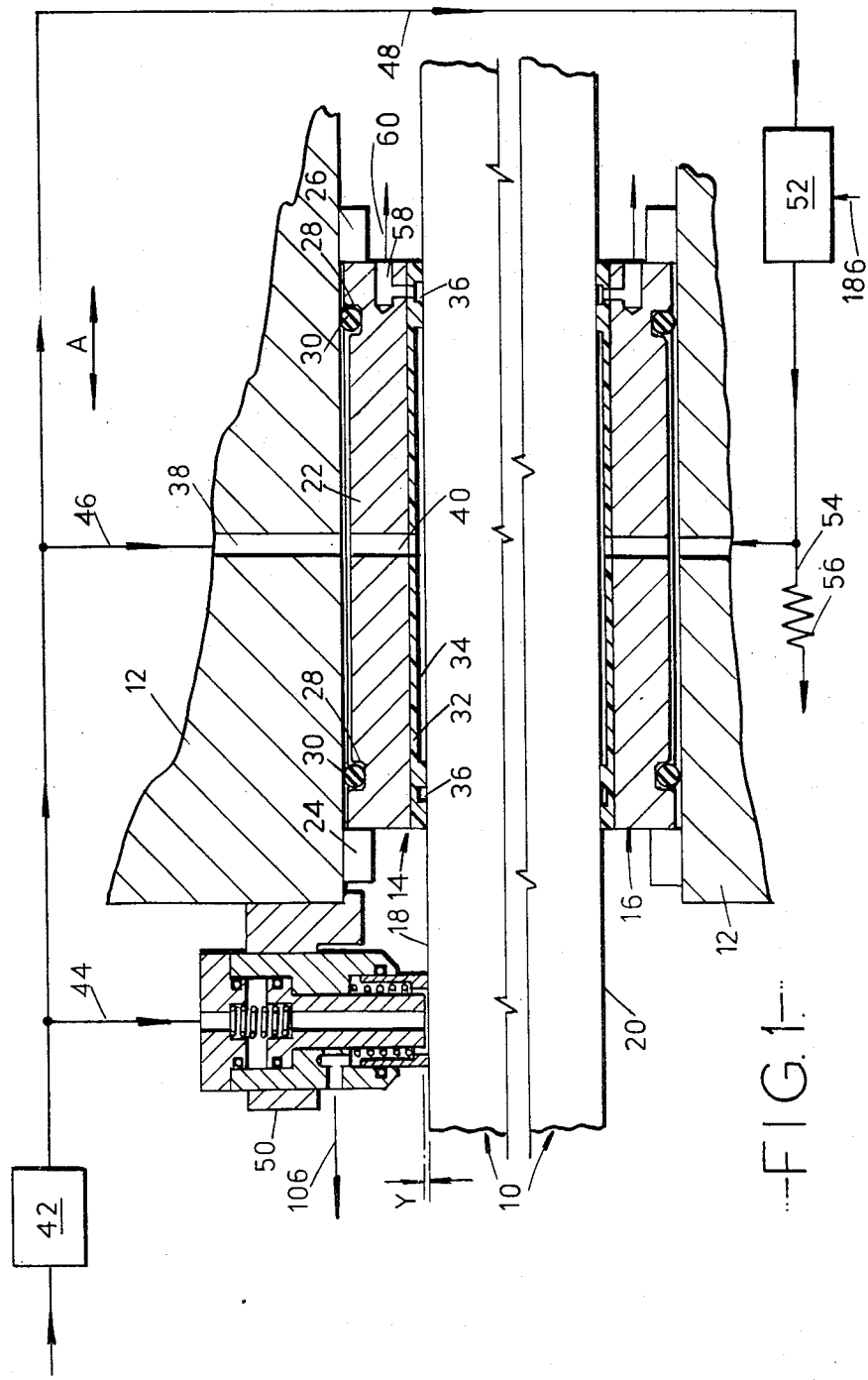

United States Patent [19]
Ennis

[11] 3,717,392
[45] Feb. 20, 1973

[54] RELATING TO HYDROSTATIC BEARINGS

[75] Inventor: Brian Ennis, Halifax, England

[73] Assignee: William Asquith Limited, Halifax, Yorkshire, England

[22] Filed: Feb. 16, 1971

[21] Appl. No.: 115,325

[30] Foreign Application Priority Data

July 10, 1970 Great Britain.....................33,656/70

[52] U.S. Cl..............................308/5 R, 184/5, 308/9
[51] Int. Cl................................................F16c 17/00
[58] Field of Search...........308/5, 9, 122, 3 A; 184/5, 184/1 CE

[56] References Cited

UNITED STATES PATENTS

| | | | |
|---|---|---|---|
| 3,251,633 | 5/1966 | Mohsin | 308/9 |
| 3,260,162 | 7/1966 | Atherton | 308/5 R |
| 3,266,854 | 8/1966 | Aller | 308/5 R |
| 3,398,996 | 8/1968 | Wucherer | 308/9 |
| 3,062,593 | 10/1962 | Royle | 308/122 |

FOREIGN PATENTS OR APPLICATIONS

| | | | |
|---|---|---|---|
| 1,372,163 | 10/1963 | France | 308/5 R |
| 197,280 | 7/1965 | Sweden | 308/5 R |
| 1,076,404 | 7/1967 | Great Britain | 308/5 R |
| 1,013,299 | 12/1965 | Great Britain | 308/5 R |

*Primary Examiner*—Milton Kaufman
*Assistant Examiner*—R. H. Lazarus
*Attorney*—Norris & Bateman

[57] ABSTRACT

The invention provides a hydrostatic bearing arrangement for a machine tool. Two "floating pad" type hydrostatic bearings are active between first and second relatively movable parts of the machine, the bearings facing in opposite directions. A detector is fixed relatively to the first relatively movable part, and directs a fluid outlet towards a reference surface. The back pressure at the detector is measured and and the pressure of fluid supplied to one of the bearings is controlled in proportion to that at the detector, the pressure at the other bearing being reduced as that at the first bearing increases and vice versa. A special resilient detector is also described.

12 Claims, 12 Drawing Figures

3,717,392
SHEET 2 OF 5
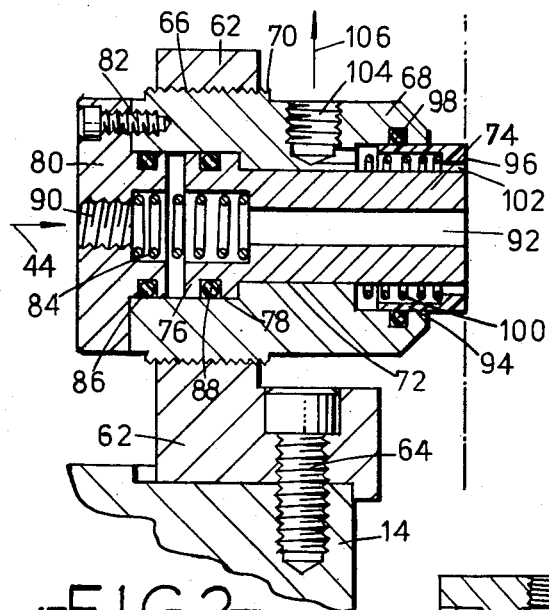
FIG.2.
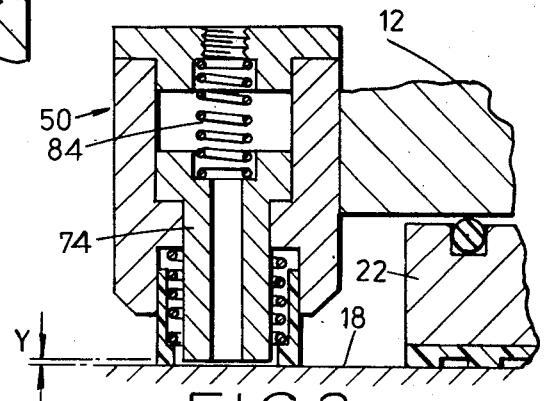
FIG.3.
FIG.4.
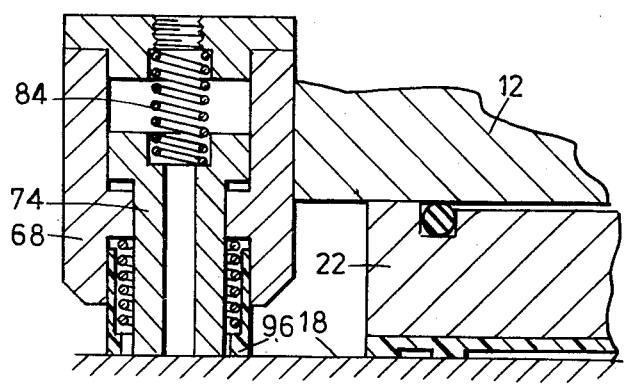
INVENTOR:
BRIAN ENNIS
BY Norris Bateman
NORRIS & BATEMAN

INVENTOR:
BRIAN ENNIS

BY Norris & Bateman

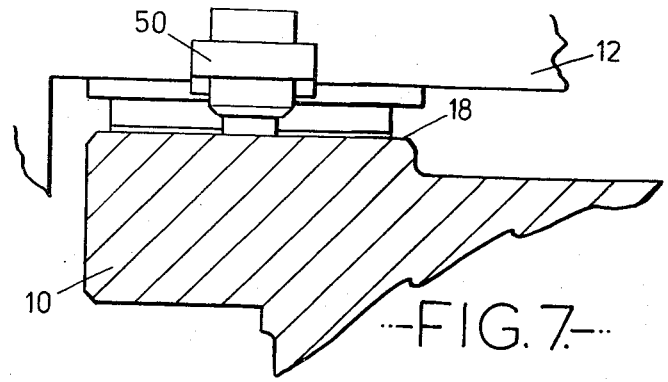
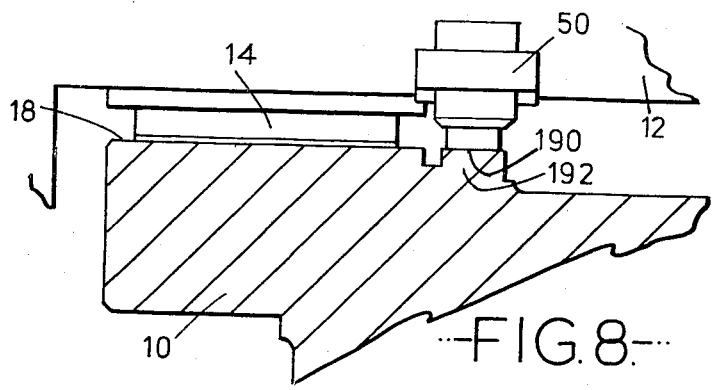
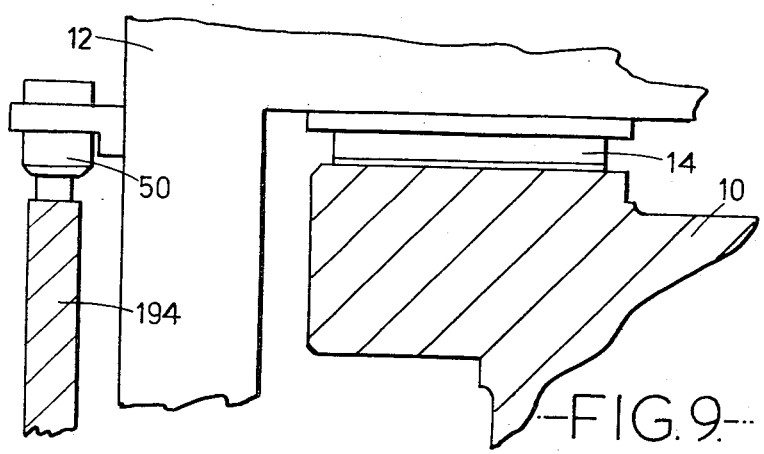

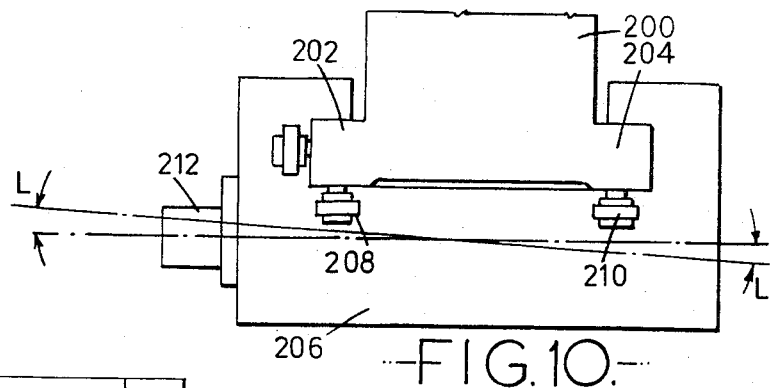
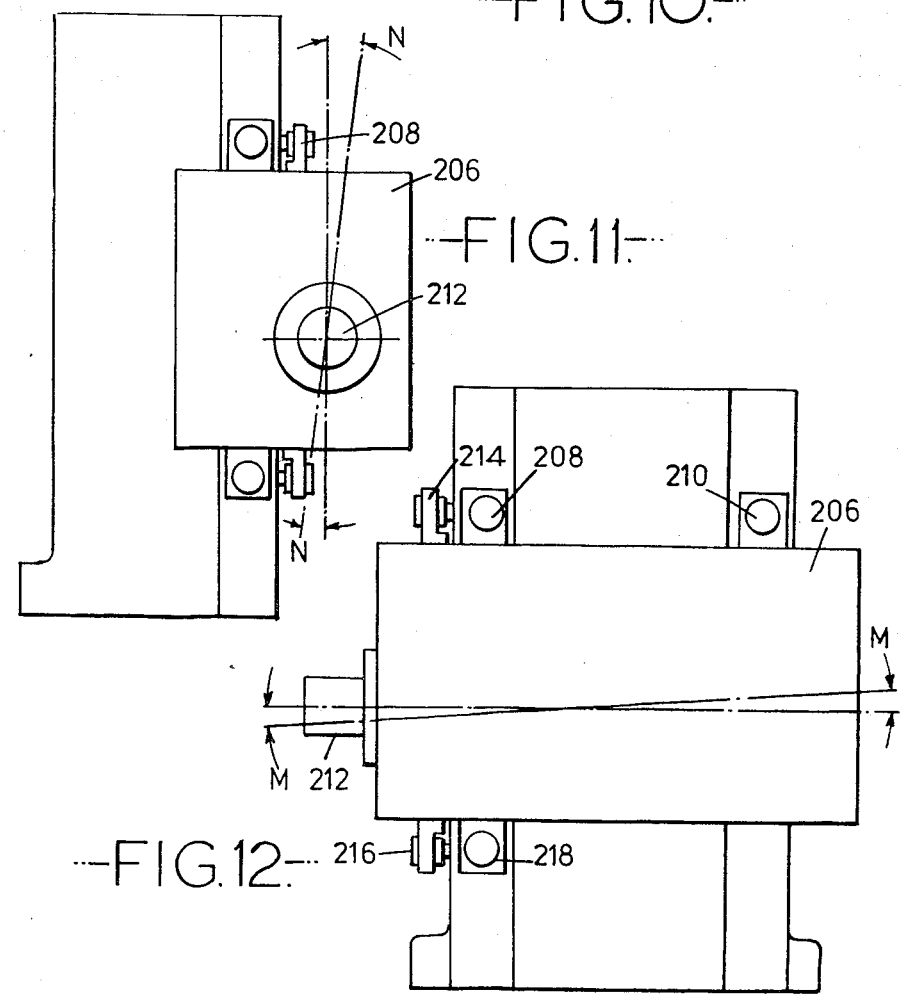

RELATING TO HYDROSTATIC BEARINGS

The application of hydrostatic bearings to machine tools is now well known, but there are certain problems, notably that of ensuring correct alignment of the movable part — especially where large masses are involved. One instance of this is in the use of hydrostatic bearings to support the sliding member which houses the ram of a ram type horizontal boring machine. This member is relatively massive, because it has to be rigid to support the ram and its driving gearing. Consequently, accurate alignment of the sliding member on hydrostatic bearings is difficult.

The principal object of the invention is to provide means for aligning the supported member with greater accuracy than has been possible heretofore when using hydrostatic bearings.

According to this invention a bearing arrangement for use in a machine tool between first and second relatively movable parts of a machine tool comprises two floating pad type hydrostatic bearings located on the first part and acting in opposite directions on the second part, a detector fixed relatively to the first part and directing a fluid outlet towards a reference surface fixed relatively to a desired path of movement of the moving part, means for supplying fluid under pressure simultaneously to a detector and the two hydrostatic bearings, first valve means to regulate the pressure of fluid applied to the first hydrostatic bearing in response to detected back pressure in the detector and generally in proportion to that back pressure, and second valve means to regulate the pressure applied to the second hydrostatic bearing in response to variations in the pressure applied to the first hydrostatic bearing whereby the sum of the pressures applied to the first and second bearings remains constant.

The first valve means may comprise a restrictor valve adapted to supply fluid to the first hydrostatic bearing at a pressure proportional to the detected back pressure at the detector, and the second valve means may comprise a so-called "adding valve" adapted to feed fluid to the second hydrostatic bearing at a pressure equal to a constant pressure less the pressure of the fluid supply to the first hydrostatic bearing.

A floating pad type of hydrostatic bearing is one in which the working fluid is forced into a chamber in one of the relatively moving parts of the machine, and out through a bearing pad which is free to move within the chamber towards and away from the other relatively moving part of the machine. The bearing pad has a continuous peripheral "land" on the outer side (i.e. the side facing the other relatively moving part of the machine) which defines the area of the fluid reservoir on which the other part of the machine floats. The area of the bearing pad which is exposed to fluid pressure within the chamber acting to force the pad outwardly is greater than the area of the fluid reservoir, so that when fluid is applied to the chamber under pressure, there is a greater force urging the bearing pad outwardly than that (due to the fluid in the reservoir) urging the pad inwardly.

This type of hydrostatic bearing with a peripheral seal or land on its outer face and a provision for a differential fluid pressure effect is adapted to operate with little or no clearance between the peripheral "land" and the other bearing member, and consequently there is only a very low leakage of fluid out at the sides of the bearing pad. A feature of this type of bearing which is of some significance in the present invention is that the gap between the rear of the bearing pad and the member on which it is mounted can be comparatively large, to allow for movement of the pad. This type of bearing is referred to herein as a floating pad hydrostatic bearing.

Since it is essential that there is a clearance between the two relatively movable parts, it will be appreciated that the "floating pad" type of hydrostatic bearing is very useful in minimizing the escape of fluid from the bearing or bearings. However, the escape of fluid is further minimized (or even eliminated) if the hydrostatic bearings are constructed as described in the specification of our corresponding patent application Ser. No. 115,423 filed Feb. 16, 1971.

According to a preferred feature of the invention the detector has a part which is able to yield when contacted by the reference surface to prevent damage to the detector. Preferably the detector comprises a piston slideable within a housing in a direction towards and away from the reference surface, the piston being bored to provide the fluid outlet, but being arranged in its housing so that the fluid supplied to the detector urges the piston towards the reference surface, there being a step to limit movement of the piston in this direction. The piston may be spring urged towards the second relatively movable part to ensure that the clearance between the piston and the second relatively movable part is at a minimum when fluid is first applied to the bearings. Also there may be a sleeve surrounding the piston and spring urged in the same direction as the piston to act as a scavenging device for fluid flowing out of the detector.

The detector may be arranged to direct its fluid flow on to a surface of the second relatively movable part, that surface being parallel with the desired path of movement of the first moving part.

Alternatively, it may be arranged to direct its fluid flow on to a reference member (such as a straight edge) mounted independently of the relatively movable parts and therefore not subject to the wear and/or deflection of those parts.

Preferably the detector is adjustable towards and away from the reference surface. If two spaced apart bearings active in the same direction on the same relatively movable part are controlled by two adjustable detectors, it is possible by adjustment of the detectors to tilt the part supported by the two bearings. In this way it is possible to correct the alignment of a movable part without expensive and slow procedure such as scraping sideways.

In a preferred arrangement, a part mounted for longitudinal movement (e.g. the ram of a horizontal boring machine) is supported by at least three floating pad type hydrostatic bearings (two of which are the bearings already referred to) each with adjustable detectors and so arranged that the supported part can be tilted in the planes at right angles to each other about its longitudinal axis. There may be five such bearings and detectors arranged so that the supported part can be tilted in all three planes about its longitudinal axis.

Figure 6:
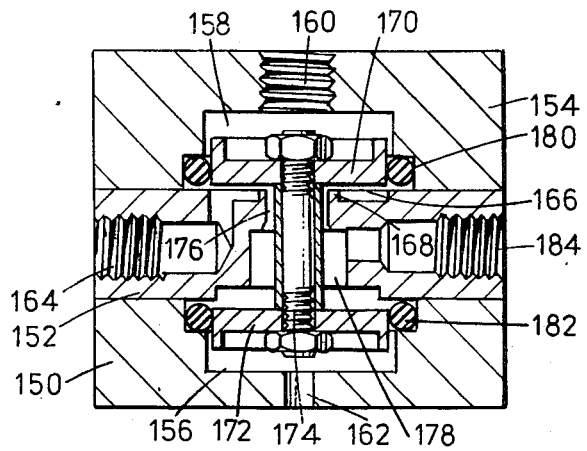
Figure 5:
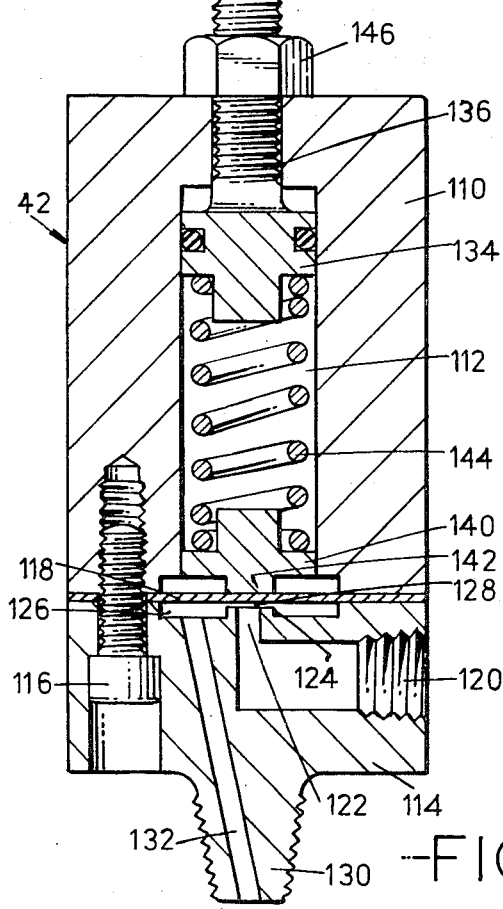

The arrangement of a sliding member which carries the ram in a ram type boring machine will now be described by way of example of the application of the invention, with reference to the accompanying drawings, in which:

FIG. 1 is a diagrammatic horizontal section through part of the mounting for the sliding member, FIG. 2 is a detailed section through a detector device, FIG. 3 shows the detector device of FIG. 2 in the normal operating position, FIG. 4 is a view similar to FIG. 3, but showing the detector device in a "collapsed" condition, FIG. 5 is a section through a diaphragm controlled restrictor valve, FIG. 6 is a section through an "adding" valve, FIG. 7 is a part sectional view having an arrangement of a detector reading on a slideway, for the sliding member, FIG. 8 is a view similar to FIG. 7, but showing the detector reading on a separate machine surface of the slideway, FIG. 9 is a view similar to FIG. 7, but showing the detector reading on a completely separate straight-edge, FIG. 10 is a diagrammatic plan view of a boring machine, FIG. 11 is an end view of the machine shown in FIG. 10, and FIG. 12 is a side view of the machine shown in FIG. 10.

As will be explained in detail later the arrangement provides for the total support of the sliding member which is slidable vertically on the column of a ram type boringmachine, but for the purpose of explaining the principal of operation of the invention, it is necessary to refer only to FIG. 1.

One of the slideways of the machine column is shown at 10, and part of the sliding member is shown at 12. In this arrangement, the slideway 10 is stationary, and the member 12 moves in the direction of the arrow "A." The member 12 has to be supported for sliding movement relatively to the slideways 10, and for this purpose there are hydrostatic bearings 14 and 16 carried by the member 10, but active respectively between that member and oppositely facing surfaces 18 and 20 of the slideway. The weight distribution of the member 12 is such that it tends to rest on the bearing 14 and move away from the bearing 16.

The two bearings 14 and 16 are identical in construction and operation, so that it is only necessary to describe one in detail. Generally it may be said that the bearings are of the "floating pad" type, and more specifically they may be constructed as described in said Ser. No. 115,423.

Basically, each bearing comprises a "floating" metal pad 22 of rectangular shape, located endwise by metal stops 24 and 26 fixed to the member 12. Because they are at the ends of the pad relatively to its direction of movement (with the member 12) the stops 24 and 26 prevent any relative longitudinal movement (i.e. movement parallel to the direction of sliding of the member 12) between the pad 22 and the member 12.

A continuous groove 28 of rectangular shape with generously rounded corners is formed in the inside face of the pad 22 (i.e. the face facing the member 12) and a rubber 'O' ring 30 or other resilient ring is fitted into the groove 28. The size of the 'O' ring 30 is such that in free conditions, it engages with the surface of the member 12 and holds the back face of the pad clear of that surface. The total clearance between the area inside of 'O' ring and the surface of the member 12 is of the order of 0.10 inches.

The outer face of the pad 22 is covered by a layer 32 of plastics material (e.g. nylon) which has a large rectangular recess 34 and a continuous narrow groove 36 surrounding but spaced from the recess 34. This groove 36 divides the "land" surrounding the recess 34 and provides in effect a labyrinth for fluid flowing outwardly from the recess 34 across the "land." A passage 38 formed in the member 12 provides fluid supply means to the area on the inside of the pad bounded by the 'O' ring 30, and there is a port 40 leading through the pad from this area to the recess 34. It is an important feature of the floating pad type bearing that the area bounded by the 'O' ring 30 is greater than the area of the recess 34, so that when fluid under pressure is supplied via the passage 38, there is a differential force applied to the pad which urges the pad outwardly. This differential force is only small, but it serves to maintain the plastics facing 32 in engagement with the surface 18 of the slideway 10 despite slight variations in the clearance between the member 12 and the surface 18. The fact that the facing 32 engages with the slideway reduces the flow of fluid through the bearing and this has advantages as described in said Ser. No. 115,423.

It will be apparent from the foregoing description of the bearing itself, that it is possible for the member 10 to move to a small extent laterally in relation to the slideway while still remaining supported by the bearings 14 and 16. The arrangement must be such however that with maximum lateral displacement in either direction, the 'O' rings 30 of both bearings remain under compression, though obviously, one will be compressed more than the other.

The machine is provided with a hydraulic fluid supply only parts of which are represented in FIG. 1. There is the usual reservoir (not shown) and power driven pump (not shown) and there may be the usual filter. The fluid supply to the bearings 14 and 16 is through the diaphragm controlled restrictor valve 42 and then through three parallel conduits 44, 46 and 48, the first leading to a detector device 50, the second to the bearing 14 through the passage 38 and the last to the bearing 16 via an "adding valve" 52. A further conduit 54 leads through a restrictor device 56 from the part of the conduit 54 between the "adding valve" and the bearing 16 to the reservoir. In addition, each of the bearings 14 and 16 has a scavenging outlet 58 through which fluid which leaks across the "land" of the facing 32 into the groove 36 is able to flow. A conduit 60 leads from each scavenging outlet 58 to the reservoir. External leakage of fluid beyond the groove 36 is reduced by the part of the "land" outside that groove.

Before describing the operation of the hydraulic circuit, it is necessary to describe in some detail three of the control items connected in the supply circuit to the bearings 14 and 16. These three items are (a) the detector device 50, (b) the diaphragm controlled restrictor valve 42 and (c) the "adding valve" 52.

The detector device 50 is illustrated in greater detail in FIGS. 2, 3 and 4. A mounting bracket 62 is fixed to the member 12 (or whatever member is fitted with the detector) by setscrews 64. The bracket has a bore 66 formed with an accurately machined fine pitch screw thread, and a cylindrical body 68 has an externally screw-threaded portion 70 which engages in the bore 66 of the bracket 62. By turning the body about its own longitudinal axis, it is possible to adjust the axial position of the body towards and away from a reference surface with which the detector co-operates, which in this instance is the surface 18 of the slideway 10.

Within the bore 72 of the body 68 there is a nozzle 74 which is generally cylindrical, but which has an enlarged outer end portion 76 slidable in an enlarged bore 78 of the body. The outer end of the bore 78 is closed by an end cap 80 secured to the body 68 by setscrews 82, and it will be observed that the permissible movement of the nozzle 74 is limited on the one hand by the end cap 80 and on the other hand by the shoulder formed in the body by the reduction from the bore 78 to the bore 72. A compression spring 84 operative between the cap 80 and the nozzle 74 urges the latter towards its inner position shown in FIG. 2.

A resilient sealing ring 86 seals between the cap 80 and the body 68 and a similar ring 88 seals between the enlarged portion 76 of the nozzle and the body 68. The enlarged portion 76 can therefore be regarded as a piston sliding in a hydraulic cylinder. An inlet port 90 passes through the cap 80 and the conduit 44 from the diaphragm controlled restrictor valve 42 is connected to this port. Also the nozzle 74 has a bore 92 extending through it. Consequently when the hydraulic fluid is supplied through the conduit 44, it will flow through the detector and out of the nozzle 74, providing that there is a gap between the inner end of the nozzle and the reference surface 18. At the same time, the pressure in the fluid acts on the enlarged outer end 76 of the nozzle and urges the latter inwardly towards the reference surface 18.

At its inner end, the body 68 is formed with an enlarged bore 94, and a nylon scavenging bush 96 is slidable in this bore, there being a sealing ring 98 providing a hydraulic seal between the bush 96 and the body 68, and a light compression spring 100 active between the body 68 and the bush 96 to urge the latter inwardly. A narrow annular port 102 is left between the outside of the nozzle 74 and the bush 96, and there is a scavenging port 104 communicating with the interior of the bush 96. This arrangement provides that the bush 96 always engages the surface 18, and the bulk of the fluid flowing out of the nozzle 74 is caught by the bush and returned via the port 104 and a return pipe 106 to the reservoir.

To set the detector 50 the body 68 is adjusted axially to a position where with the nozzle in its inner position (i.e. with the head 76 engaging the shoulder in the body 68) the inner end of the nozzle is clear of the reference surface 18 by a small distance "Y" (see FIG. 3.) providing that there is the correct working clearance between the member 12 and the slideway 10. Now it will be apparent that this clearance will be smaller than the predetermined distance "Y" when the machine is at rest, because the member 12 tends to rest on the surface 18. As a result, when the fluid is supplied to the detector 50 which creates a pressure rise in the conduit 44 and the diaphragm controlled restrictor 42. As will be hereinafter described, this in turn causes increased pressure to be applied to the bearing 14 and decreased pressure to the bearing 16, so that the member 10 moves laterally to increase the clearance between the nozzle 74 and the reference surface 18. The detector 50 functions by detecting the resistance to flow of the fluid out of the nozzle and hence it measures the clearance "Y."

When the machine comes to rest, and the member 12 settles on to the surface 18 of the slideway 10, the bearing pad 22 is pressed towards its member 12 compressing the 'O' ring 30 (See FIG. 4). This of course would leave the member 12 supported on the small area of the inner end of the nozzle 74, and which would damage the nozzle and possibly the slideway 10 as well. However, the nozzle 74 is permitted to retract into the body 68 by compressing the spring 84 as shown in FIG. 4. When the fluid pressure begins to lift the member 12 away from the slideway 10, the pressure in the body 68 combined with the action of the spring 84 ensures that the nozzle 74 first moves inwardly to its set position. In other words the detector detects zero clearance "Y" until the head 76 engages with the shoulder in the body 68.

The facility of the detector to retract into its body and the screw adjustment of the body to set the clearance "Y" are important subsidiary features of the invention.

The second item which requires detailed description is the diaphragm controlled restrictor valve 42, and this is shown in detail in FIG. 5. The purpose of the restrictor valve 42 is to reduce the pressure of the fluid supply to the bearings 14 and 16 (since the supply from the pump is always at a greater pressure than that which is required at the bearings) and also to regulate the pressure supply through the conduits 44, 46 and 48 in response to the clearance "Y" detected by the detector 50.

The valve 42 has a cylindrical body 110 with a bore 112 open at its lower end. A block 114 is secured on the lower end of the body 110 by setscrews 116, but a flexible diaphragm 118 made of flexible material is nipped around its edge between the body 110 and the block 114.

An inlet port 120 in the side of the block 114 leads to a port 122 opening upwardly through a shallow boss 124 formed on the block 114 in a recess 126. The top face of the boss 124 is slightly lower than the top peripheral surface of the block 114, so that there is a small gap 128 between the boss 124 and the diaphragm 118.

An externally screw-threaded boss 130 on the block 114 enables the valve 42 to be connected to part of the member 12, and a bore 132 through the boss and the block 114 enters the recess 126. The conduit 44 is connected to the bore 132.

In the top end of the bore 112, there is an adjustable plug 134 carried by a screw-threaded stem 136 which engages in and passes through a screw-threaded hole in the closed upper end of the body 110. In the lower end of the bore 112 there is a slidable plug 140 having a protrubrance 142 which engages with the diaphragm 118 opposite the boss 124, a compression spring 144 extending between the adjustable plug 134 and the sliding plug 140 serving to hold the latter against the diaphragm 118 and so holding the diaphragm pressed down on to the boss 124 and closing the bore 132. The pressure exerted on the diaphragm can be adjusted by turning the stem 136 and the stem can be locked in any adjusted position by a locking nut 146.

When the hydraulic system is at rest, the diaphragm 118 will be held down on the boss 124. As soon as fluid flows in at the inlet 120, it lifts the diaphragm by overcoming the force of the spring 144 and flows through the narrow space 128, which acts as a restrictor to reduce the output pressure, and through the outlet bore 132 to the conduits 44, 46 and 48. Since the detector will be recording zero clearance "Y" at this time, the back pressure in the outlet 132 will increase rapidly and the pressure rise in the recess 126 will cause the diaphragm to lift further away from the boss 124. Thus the valve is opened further and more fluid can flow to the bearings 14 and 16. As will be further described, this causes the member 12 to be moved towards its desired working position. When the clearance "Y" appears the pressure in the outlet 132 lowers and the valve 32 tends to close, thus reducing the fluid flow to the bearings.

Thus the valve 42 tends to maintain a constant predetermined fluid pressure in the conduits 44, 46 and 48 and the detector 50 ensures that this predetermined pressure occurs only when the correct clearance "Y" is arrived at corresponding to the correct working position of the member 12 relatively to the slideway 10.

The "adding" valve 52, which forms the third item to be described in detail, and this valve is shown in FIG. 6. Basically this valve comprises a housing built up of sections 150, 152 and 154. The two outer section 150 and 154 have respective recesses 156 and 158, and there is a reference port 160 into the upper recess 158 and an exhaust hole 162 into the lower recess 156. An inlet port 164 enters the center section 152, and leads to an annular recess 166 surrounding a shallow boss 168.

Two pistons 170 and 172 are provided on opposite ends of a stem 174 which passes through a restricted hole 176 and an enlarged lower hole 178 in the center sections 152. The piston 170 works in the recess 158 and is sealed hydraulically by a ring 180. Similarly the piston 172 works in the recess 156 and is sealed by a ring 182.

An outlet port 184 for the valve communicates with the enlarged bore 178 below the restricted bore 176. This outlet port is connected to the conduit 54 (see FIG. 1) whilst the inlet port 164 is connected to a secondary supply conduit 186 fed from the supply pump of the apparatus. Finally, the conduit 48 carrying fluid at the same pressure as that supplied to the bearing 14 is connected to the reference port 160.

In use, the fluid entering the reference port 160 provides a reference pressure $P_1$, which varies with the pressure supplied to the bearing 14, and this acts on the piston 170 and tends to move both pistons downwardly. The secondary supply fluid at a constant pressure $P_s$ flows in at the port 164, and into the recess 166. The pressure $P_s$ therefore attempts to lift the pistons and in so doing, it opens a passage through the bore 176 into the enlarged bore 178 where it is free to flow out through the outlet port 184.

Now the pressure in the fluid within the chamber 178 acts on the piston 172 and complements the force of the reference pressure acting on the piston 170, but opposes acting on the underside of the piston 170. Eventually an equilibrium position is arrived at and an output pressure $P_2$ is produced. But any increase in the reference pressure $P_1$ will tend to close the piston 170 on the boss 168 and so reduce the outlet pressure $P_2$. Thus there are created conditions under which $P_2 = P_s - P_1$. This means that as the pressure to the bearing 14 increases, that to the bearing 16 decreases.

The adding valve will only function properly if there is actual flow of fluid through it, but the floating pad bearings are urged into contact with the slideway 10, and this practically stops flow of fluid from those bearings. Thus there is virtually no flow out through the bearing 16. But there is a flow through the restrictor device 56, which is proportional to the pressure at the bearing 16, and this enables the adding valve 52 to function.

It is now possible to describe the overall operation of the arrangement shown in FIG. 1. At rest, the member 12 will lie with the bearing 14 under compression (i.e. its 'O' ring 30 compressed) and the bearing 16 only lightly touching the slideway 10. When the fluid supply is started, the detector 50 detects zero clearance and pressure begins to build up in the supply conduits 44, 46, and 48. This causes the bearing 14 to move outwardly and at the same time due to the increase in the pressure $P_1$, the pressure $P_2$ drops and the bearing 16 is allowed to retract.

This process continues until the detector 50 senses the correct clearance, at which point pressure ceases to build up in the conduits 44, 46 and 48, and ceases to drop in the conduit 54. Therefore the member 12 stays in this correct disposition relatively to the slideway 10, and thereafter the hydrostatic bearings function normally. If for any reason however, such as loading on the machine tool, the member 12 moves laterally, the detector will sense this movement and a pressure change will occur automatically to restore the proper clearance between the member 12 and the slideway 10.

The detector 50 may be mounted in several ways as is illustrated in FIGS. 7, 8 and 9. Referring firstly to FIG. 7 the detector 50 is shown carried by the member 12 and working in co-operation with the surface 18 of the slideway 10. It is an important subsidiary feature of the invention that the detector does not have any form of stylus engaging on the reference surface, but operates by detecting the clearance between itself and that surface. Consequently it is possible to use the bearing surface of the slideway as the reference surface because there is no damage to that surface, nor is there any wear of the detector to cause inaccuracies.

FIG. 8 however shows an alternative arrangement in which the bearing 14 acts on the surface 18 of the slideway, but the detector 50 co-operates with a surface 190 formed on a narrow ledge 192 parallel with but separate from the surface 18. Since the surface 18 need not be finished to the same degree of accuracy as the surface 190, this is a cheaper arrangement. Moreover, it may be possible to arrange that the ledge 192 is not subjected to the same mechanical stresses as the slideway 10.

The arrangement illustrated in FIG. 9 carries the separation of the detection and bearings still further, because the detector 50 co-operates with a straightedge 194 mounted independently of the slideway 10.

An important practical advantage of the invention is that it is possible to tilt one part of a machine tool relatively to its slideway to produce a desired alignment, and this is illustrated in FIGS. 10,11 and 12.

Taking only FIG. 10, it will be observed that there is a column 200 formed with two slideways 202 and 204. A slidable spindle housing 206 slides on the column 200. Each of these slideways has its own bearing arrangement (not shown) similar to that described with reference to FIG. 1, and each bearing arrangement has its own detector valve 208 and 210 respectively. Now if the valve 208 is adjusted towards the slideway 202 the housing 206 will be tilted. This tilt is illustrated, but greatly exaggerated by the chain dotted line "L—L" in FIG. 10. Thus the longitudinal axis of a ram 212 carried by the housing can be tilted.

This facility for tilting the ram housing can be used to correct misalignments without expensive alterations to the machine (such as scraping the slideways).

The arrangement shown in FIGS. 10,11 and 12 is quite sophisticated in that the housing 206 is supported by various hydrostatic bearing arrangement all as previously described, and with detectors 208 and 210 to permit tilting of the longitudinal axis in a vertical plane (line "L—L") detectors 214 and 216 to permit tilting of the longitudinal axis in a horizontal plan (line "M—") a detector which co-operates with the detector 228 to permit tilting of the housing along the longitudinal axis of the ram itself (line "N—N").

Clearly other arrangements of the detectors could be adopted for different circumstances depending upon the machine tool to which the bearings are applied.

What we claim is:

1. A bearing arrangement active between first and second relatively movable parts of a machine and comprising at least two floating pad type hydrostatic bearings located on the first part and acting in opposite directions on the second part, means whereby each of said floating pad bearings is urged by fluid pressure differential into contact with said second part, at least one detector fixed relatively to the first part and directing a fluid outlet towards a reference surface fixed relatively to a desired path of movement of the moving part, means for supplying fluid under pressure simultaneously to the detector and the two hydrostatic bearings, valve means to regulate the pressure of fluid applied to the first hydrostatic bearing in response to detected back pressure in the detector and generally in proportion to that back pressure, and adding valve means adapted to feed fluid to the second hydrostatic bearing at a pressure equal to a constant pressure less than the pressure of the fluid supply to the first hydrostatic bearing whereby the sum of the pressure applied to the first and second bearings remains constant, said adding valve means having outlet means in addition to that supplying pressure to said second hydrostatic bearing permitting fluid flow through said adding valve means.

2. A bearing arrangement as claimed in claim 1, in which a restrictor is provided in said additional outlet means, and fluid flow through the restrictor is proportional to the pressure at said second hydrostatic bearing.

3. A bearing arrangement as claimed in claim 1, in which the first valve means comprises a restrictor valve adapted to supply fluid to the first hydrostatic bearing at a pressure proportional to the detected back pressure at the detector.

4. A bearing arrangement as claimed in claim 1 in which the detector has a part which is able to yield when contacted by the reference surface to prevent damage to the detector.

5. A bearing arrangement as claimed in claim 4, in which the detector comprises a piston slideable within a housing in a direction towards and away from the reference surface, the piston being bored to provide the fluid outlet, but being arranged in its housing so that the fluid supplied to the detector urges the piston towards the reference surface, there being a step to limit movement of the piston in this direction.

6. A bearing arrangement as claimed in claim 5, in which the piston is spring urged towards the second relatively movable part to ensure that the clearance between the piston and the second relatively movable part is at a minimum when fluid is first applied to the bearings.

7. A bearing arrangement as claimed in claim 6, in which said yieldable sleeve is a sleeve surrounding the piston and spring urged in the same direction as the piston to act as a scavenging device for fluid flowing out of the detector.

8. A bearing arrangement as claimed in claim 1, in which the detector is arranged to direct its fluid flow on to a surface of the second relatively movable part, that surface being parallel with the desired path of movement of the first moving part.

9. A bearing arrangement as claimed in claim 1, in which the detector is arranged to direct its fluid flow on to a reference member (such as a straight edge) mounted independently of the relatively movable parts.

10. A bearing arrangement as claimed in claim 1 in which the detector is adjustable towards and away from the reference surface.

11. A machine tool having a bearing arrangement as recited in claim 1 in which one of said parts is mounted for longitudinal movement (e.g., the ram of a horizontal boring machine) and is supported by at least three floating pad type hydrostatic bearings each with adjustable detectors and so arranged that the supported part can be tilted in the planes at right angles to each other about its longitudinal axis.

12. A machine tool as claimed in claim 13, in which there are five such bearings and detectors arranged so that the supported part can be tilted in all three planes about its longitudinal axis.

* * * * *